Apr. 3, 1923.
E. H. PLATT
1,450,643
POWER TRANSMISSION FOR MOTOR VEHICLES
Filed Mar. 9, 1921
3 sheets-sheet 1
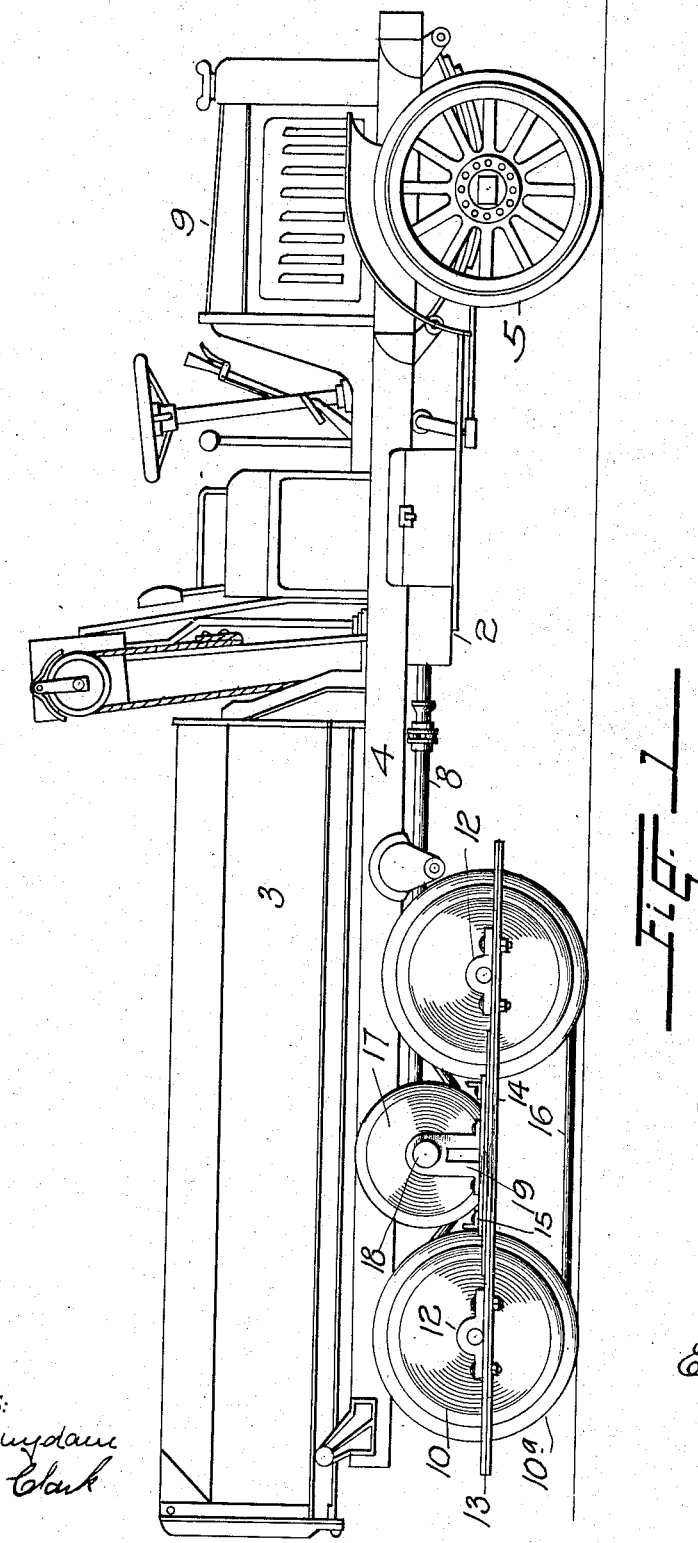

Apr. 3, 1923.
E. H. PLATT
1,450,643
POWER TRANSMISSION FOR MOTOR VEHICLES
Filed Mar. 9, 1921
3 sheets-sheet 2
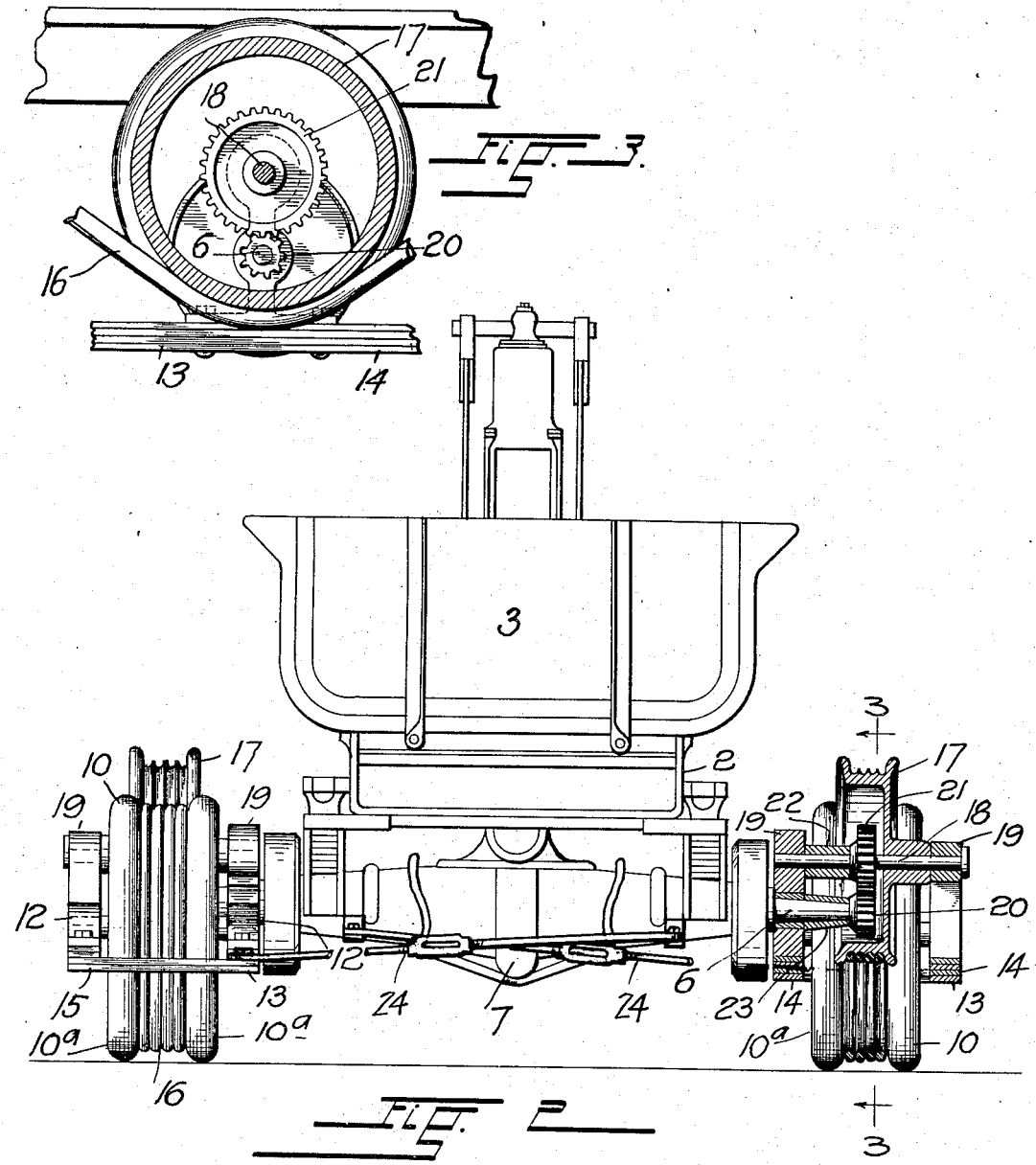
WITNESS:
INVENTOR.

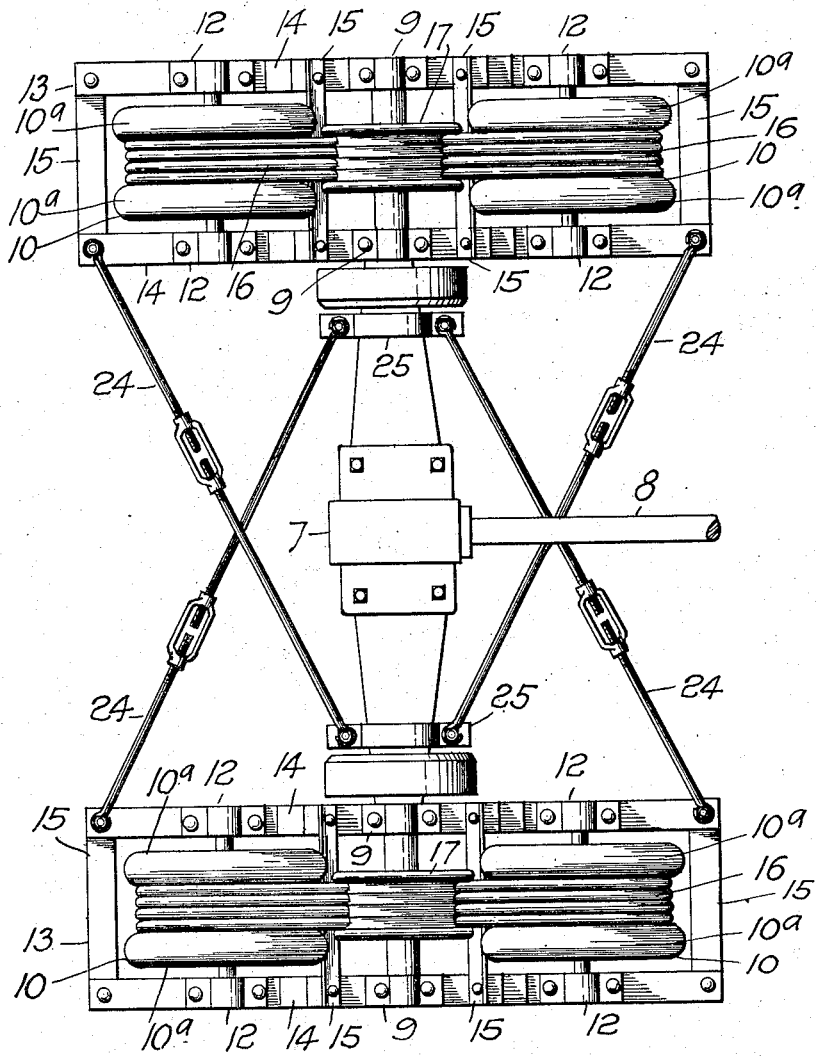

Patented Apr. 3, 1923.

1,450,643

UNITED STATES PATENT OFFICE.

EDWIN H. PLATT, OF DENVER, COLORADO, ASSIGNOR OF ONE-HALF TO EDWIN F. PLATT, OF PORTLAND, OREGON.

POWER TRANSMISSION FOR MOTOR VEHICLES.

Application filed March 9, 1921. Serial No. 450,944.

*To all whom it may concern:*

Be it known that I, EDWIN H. PLATT, a citizen of the United States, residing at Denver, in the county of Denver and State of Colorado, have invented certain new and useful Improvements in Power Transmission for Motor Vehicles, of which the following is a specification.

This invention relates to self-propelling vehicles and more particularly to motor driven vehicles of the type commonly known as trucks.

It is the main object of the present invention to provide a flexible medium for transmitting the power originated in the motor of a vehicle of the character above referred to, to the traction wheels of the same, which combines simplicity of construction with practicability and efficiency in use.

Another object of the invention is to provide a power transmission of the above described type which is readily applied to trucks already in use, and a further object is to provide a traction system for heavy motor vehicles which by an arrangement of road wheels in pairs at opposite sides thereof, permits of a more even distribution of the load and greatly increases the traction of adhesion of the vehicle with the surface of the road along which it is propelled.

Still another object of the invention is to arrange a flexible transmission medium with relation to the road-wheels of a motor driven vehicle so that it can function as a track on soft and slippery surfaces, and further objects reside in the constructions, arrangements and combinations of parts all of which will be fully disclosed in the course of the following description with reference to the accompanying drawings.

In the drawings in the several views of which corresponding parts are designated by similar characters of reference, Figure 1 represents a side elevation of a truck to which my invention is applied;

Figure 2, a rear end elevation of the same, partially in section and drawn to a somewhat enlarged scale;

Figure 3, a section taken on the line 3—3, Figure 2, and

Figure 4, a plan view of the traction and transmission elements of my invention in operative connection with the axle of a truck to which it is applied.

Referring more in detail to the drawings, the reference character 2 designates a truck of standard type including a body 3 of suitable size and construction, a chassis 4 supporting the same, wheels 5 supporting the chassis at the front end of the vehicle in connection with the steering gear, and a driven axle 6 which through the intermediary of a differential gearing enclosed in a dust-proof casing 7, and a driving shaft 8, is operatively connected with the power plant of the vehicle which as usual is installed beneath a protective hood or covering 9 at the front end of the same.

For the application of my invention, the rear road wheels are removed from the ends of the rear axle and replaced by two units of a traction element the construction of which will now be described.

Each unit comprises two road wheels 10 mounted tandem fashion in boxes 12 on a frame 13. The frame is composed of side members 14 placed at opposite sides of the wheels and preferably made of spring metal, and cross-pieces 15 which connect the side members in substantially parallel relation to each other.

The road wheels have each a drum-face between treads of larger diameter provided by tires 10ᵃ which may be made of solid rubber, metal or other suitable material or which, on trucks or light construction may be of the pneumatic type and attached to the wheels by demountable rims.

The flexible medium through which the mechanical power produced by the motor of the vehicle is transmitted to the road wheels of the present attachment, consists of a continuous belt 16 preferably composed of a plurality of endless wire ropes which are stretched around the drum faces of the wheels.

The upper stretch of the belt is frictionally engaged by a driving wheel 17 on a shaft 18 which is rotatably mounted in boxes 19 on the frame intermediate of the road wheels. The driving wheel is flanged to cooperate with the tires of the road wheels in holding the belt against lateral displacement, and the faces of the several wheels engaged by the belt may be circumferentially grooved as shown in the drawings to separate the endless ropes of which the belt is composed.

It will be apparent that the rotary movement imparted to the driving wheel in one direction will be transmitted to the road wheels through the medium of the belt and cause their rotation in the opposite direction, and that in order to propel the vehicle by the ordinary clockwise rotation of the rear axle it is necessary that the driving wheels rotate in a direction opposite thereto.

With this object in view the operative connection between the end of the axle and the driving wheel of each unit is established through two meshing gear wheels 20 and 21 of different diameters, the larger one of which is connected to the shaft of the driving wheel, while the other is mounted at the end of the vehicle axle.

A convenient and practical method of arranging the above described parts, is best illustrated in Figures 2 and 3 of the drawings. The driving wheel 17 is hollow and open at its inner side and the end of the axle extends into the same through an opening in the box 19 which supports the shaft 18 of the wheel at the inner side of the frame 13.

The two gear wheels, one mounted on the shaft and the other on the end of the axle, are disposed within the hollow wheel, and distance sleeves 22 and 23 are provided to hold them in their cooperative relation.

The two units at opposite sides of the chassis of the truck each constructed and connected as hereinbefore described, are connected to the axle casing of the chassis by longitudinally extensible truss rods 24 and they are connected to the truck by the attachment of two of the rods to the axle housing through the medium of collars 25.

In the operation of my invention the clockwise rotating axle of the truck imparts a rotary movement in the opposite direction and at a decreased velocity to the driving wheels at the opposite ends thereof. The driving wheels bearing upon the upper stretches of the endless transmission belts under the influence of the major portion of the weight of the vehicle body and its load, impart a longitudinal forward movement to the belts which drive the road wheels in the same direction by frictional contact with the drums thereof.

The flexible belts aid in maintaining the vehicle body in a state of equilibrium, and it will be readily understood that the impellent action of the driving wheels upon the belts and the driving action of the latter upon the road wheels increase automatically in ratio to the weight of the supported load.

The frames in which the wheels are mounted absorb road shocks and increase the frictional contact between the belts and the wheels engaged thereby owing to the resilience of their side members.

In the event of the truck being moved onto a surface the rutted or soft condition of which causes the road wheels to sink beyond the depth of their tires, the contact of the lower portion of the road belts with the ground will cause them to function as endless tracks and thereby provide the traction of adhesion required for the movement of the load. This, however, occurs only under unusual conditions and the belts are normally held free from contact with the ground by engagement of the wheeltreads of the same as shown in the drawings.

Having thus described my improved transmission system I desire it understood that means different from those shown in the drawings may be employed for connecting the frames of the two units to each other, and to the chassis of the vehicle, that the construction of the frames may be varied under different conditions, and that other changes in the construction and arrangement of the parts may be resorted to within the scope of my invention.

What I claim and desire to secure by Letters-Patent is:

1. In a motor vehicle, the combination with the vehicle chassis, of frames connected at opposite sides thereof, traction wheels having drum faces of smaller diameter than their tread circles, mounted one before the other, on said frames, endless belts carried on said drum faces, rotary drive wheels frictionally engaging with the upper stretches of the belts, and a motor on the vehicle in driving connection with the drive wheels.

2. In a motor vehicle, the combination with the vehicle chassis, of resilient frames connected at opposite sides thereof, traction wheels having drum faces of smaller diameter than their tread circles, mounted one before the other, on said frames, endless belts carried on said drum faces, rotary drive wheels frictionally engaging with the upper stretches of the belts, and a motor on the vehicle in driving connection with the drive wheels.

3. In a motor vehicle, the combination with the vehicle chassis, of resilient frames connected at opposite sides thereof, traction wheels having drum faces of smaller diameter than their tread circles, mounted one before the other, on said frames, endless belts carried on said drum faces, rotary drive wheels mounted on the frames in frictional contact with the upper stretches of the belts, and a motor on the vehicle in driving connection with the drive wheels.

4. In a motor vehicle, the combination with the vehicle chassis, of frames connected at opposite sides thereof and having resilient side members, traction wheels having drum faces of smaller diameter than their tread circles, mounted one before the other on the side members of the frame, endless belts carried on said drum faces, rotary drive wheels in frictional contact with the upper stretches of the belts, and a motor on the vehicle in driving connection with the drive wheels.

5. In a motor vehicle, the combination with the vehicle chassis, of frames connected at opposite sides thereof and having resilient side members, traction wheels having drum faces of smaller diameter than their tread circles, mounted one before the other on the side members of the frame, endless belts carried on said drum faces, rotary drive wheels mounted on the side members of the frames in frictional contact with the upper stretches of the belts, and a motor on the vehicle in driving connection with the drive wheels.

6. In a motor vehicle, the combination with the vehicle chassis, of frames adjustably connected at opposite sides thereof, traction wheels having drum faces of smaller diameter than their tread circles, mounted one before the other, on said frames, endless belts carried on said drum faces, rotary drive wheels frictionally engaging with the upper stretches of the belts, and a motor on the vehicle in driving connection with the drive wheels.

7. In a motor vehicle, the combination with the vehicle chassis, of a driving axle thereon, a casing for the axle, frames at opposite sides of the chassis, rods connecting the frames with the axle casing, traction wheels having drum faces of smaller diameter than their tread circles, mounted one before the other, on said frames, endless belts carried on the drum faces, and drive wheels operatively connected with the axle, and in frictional contact with the upper stretches of the belts.

8. In a motor vehicle, the combination with the vehicle chassis, of a driving axle thereon, a casing for the axle, frames at opposite sides of the chassis, longitudinally extensible rods connecting the frames with the axle casing, traction wheels having drum faces of smaller diameter than their tread circles, mounted one before the other, on said frames, endless belts carried on the drum faces, and drive wheels operatively connected with the axle, and in frictional contact with the upper stretches of the belts.

9. In a motor vehicle, the combination with the vehicle chassis, of frames connected at opposite sides thereof, traction wheels having drum faces of smaller diameter than their tread circles, mounted one before the other on said frames, endless belts carried on the drum faces, rotary drive wheels on the drum faces, rotary drive wheels mounted on the frames, in frictional contact with the upper stretches of the belts, and a transverse axle on the chassis in driving connection with the drive wheels.

10. In a motor vehicle, the combination with the vehicle chassis, of frames connected at opposite sides thereof, traction wheels having drum faces of smaller diameter than their tread circles, mounted one before the other on said frames, endless belts carried on the drum faces, rotary drive wheels mounted on the frames, in frictional contact with the upper stretches of the belts, an axle transverse of the chassis, and gearing transmitting the rotary movement of the axle to the drive wheels.

11. In a motor vehicle, the combination with the vehicle chassis, of frames connected at opposite sides thereof, traction wheels having drum faces of smaller diameter than their tread circles, mounted one before the other on said frames, endless belts carried on the drum faces, rotary drive wheels mounted on the frames, in frictional contact with the upper stretches of the belts, an axle transverse of the chassis, supported on the frames, and gearing transmitting the rotary movement of the axle to the drive wheels.

12. In a motor vehicle, the combination with the vehicle chassis, of frames connected at opposite sides thereof, traction wheels having drum faces of smaller diameter than their tread circles, mounted one before the other on said frames, endless belts carried on the drum faces, rotary hollow drive wheels mounted on the frames, in frictional contact with the upper stretches of the belts, an axle transverse of the chassis, supported on the frames, and gearing inside the drive wheels, transmitting the rotary movement of the axle to the same.

In testimony whereof I have affixed my signature.

EDWIN H. PLATT.